United States Patent [19]

Matsui

[11] Patent Number: 4,598,857

[45] Date of Patent: Jul. 8, 1986

[54] METHOD OF PRODUCING DOUBLE-WALL COMPOSITE PIPES

[75] Inventor: Shigetomo Matsui, Higashiosaka, Japan

[73] Assignee: Kawasaki Jukogyo Kabushiki Kaisha, Hyogo, Japan

[21] Appl. No.: 595,837

[22] Filed: Apr. 2, 1984

[51] Int. Cl.⁴ .................. B23K 31/00; B23K 31/06; B23P 11/02

[52] U.S. Cl. .................................. 228/132; 228/135; 228/265; 29/447; 156/86

[58] Field of Search ............ 228/132, 131, 127, 222, 228/128, 135, 265; 29/447; 156/86, 294; 164/486

[56] References Cited

U.S. PATENT DOCUMENTS

| | | | |
|---|---|---|---|
| 3,025,596 | 3/1962 | Ward et al. | 228/131 |
| 3,064,344 | 11/1962 | Arne | 29/447 |
| 3,604,102 | 9/1971 | Saluggia et al. | 228/131 |
| 4,449,281 | 5/1984 | Yoshida et al. | 29/447 X |
| 4,493,363 | 1/1985 | Fredriksson et al. | 164/486 X |

Primary Examiner—Nicholas P. Godici
Assistant Examiner—Samuel M. Heinrich
Attorney, Agent, or Firm—Wenderoth, Lind & Ponack

[57] ABSTRACT

In order to produce a double-wall composite metal pipe, a pipe assembly, made up of an outer pipe of carbon steel and an inner pipe of stainless steel inserted in the outer pipe with an annular clearance therebetween is caused to advance relative to a plastic working device such as die or a series of rollers. Before the pipe assembly is caused to pass through the plastic working device, the outer pipe is heated to cause it to expand thereby increasing the annular clearance between the inner and outer pipes and establishing a temperature difference between the outer and inner pipes. The heated outer pipe is constricted by device of the plastic working means and caused to plastically contract against the outer surface of the inner pipe, while the inner pipe is subjected to expanding force of a mandrel inserted in the inner pipe, the mandrel backing up the pipe assembly from within the inner pipe against the constricting action of the plastic working device. The pipe assembly thus subjected to the action of the plastic working device is cooled from the outside whereby the outer pipe is caused to shrink to firmly bind the inner pipe thereby to obtain a tighter fit between the pipes.

12 Claims, 6 Drawing Figures

METHOD OF PRODUCING DOUBLE-WALL COMPOSITE PIPES

BACKGROUND OF THE INVENTION

This invention relates generally to the production of composite metal pipes having laminated multiple walls (hereinafter referred to as double-wall pipes) and more particularly to a technique of obtaining an extremely tight and intimate union of an inner pipe and an outer pipe in the process of producing corrosion-resistant double-wall pipes such as oil well pipes.

As is known, tubular structures to be used as, for example, oil-well pipes and piping in nuclear power plants are required to possess strength to resist pressure and heat resistance, of course, and also corrosion resistance. For meeting these requirements, there has been a trend toward the use of double-wall pipes. A typical example of such pipes is that comprising an outer pipe made of carbon steel for strength and an inner pipe of stainless steel for corrosion resistance, both steel materials possessing ample heat resistance for all practical purposes. However, for preventing trouble such as cracking and implosion of these double-wall pipes, it becomes highly important that the fit between the inner and outer pipes be extremely tight.

As measures for obtaining tight fits between the laminated pipes, the thermal shrink-fit method and the pipe-expanding method have been developed and reduced to practice. In the former method, a high degree of precision in the finishing of the surfaces of the two pipes to come into mutual contact is required, and various difficulties are encountered in practical application of this method to pipes of long unit lengths and pipes of large diameter. The pipe-expanding method has a disadvantage in that the range of selection for obtaining the desired degree of fit is limited, and, moreover, the necessary equipment for carrying out this method becomes disadvantageously large.

SUMMARY OF THE INVENTION

It is an object of this invention to provide a method of producing double-wall composite pipes in which the problems and difficulties encountered heretofore can be overcome.

Another object of this invention is to provide a method of producing a double-wall composite pipe in which the fit between the inner and outer pipes is extremely tight.

A further object of this invention is to provide a method of producing a double-wall composite pipe which is simple and inexpensive.

According to this invention, the method of producing a double-wall composite pipe comprises the steps of: preparing a pipe assembly made up of an outer pipe and an inner pipe inserted in the outer pipe; causing the pipe assembly to advance relative to a plastic working means; heating the outer pipe in a zone progressively moving along the length thereof as the pipe assembly is caused to advance toward the plastic working means, to raise the temperature of the outer pipe higher than that of the inner pipe; constricting the heated portion of the outer pipe by means of said plastic working means to plastically contract said heated portion against the outer surface of the inner pipe as the pipe assembly is caused to advance through the plastic working means; and cooling the contracted portion of the outer pipe after it has passed through the plastic working means, to cause the outer pipe to shrink so as to firmly bind the inner pipe thereby to obtain an interference fit between the inner and outer pipes.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

Figure 1:
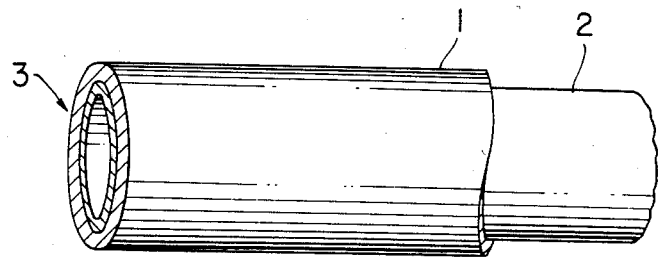
FIG. 1 is a perspective view, with portions cut away, of a typical example of a double-wall composite pipe.

An example of a double-wall composite pipe of general type with which this invention is concerned is illustrated in FIG. 1. The double-wall pipe 3, as mentioned briefly hereinbefore, comprises, for example, an outer pipe 1 made of carbon steel and an inner pipe 2 made of stainless steel, the outer and inner pipes 1 and 2 being tightly fitted together with or without a brazing material therebetween. The inner pipe 2 may be made of any other corrosion-resistant material such as a nickel base superalloy. An example of such superalloy is Inconel 625 (Trade name of a nickel base alloy produced by Cabot Corporation of U.S.A.). Other superalloys such as Hastelloy (Trade name of a nickel base alloy produced by Cabot Corporation) and Incoloy 825 (Trade name of an iron base superalloy produced by Cabot Corporation) may also be used for the inner pipe 2.

Figure 2:
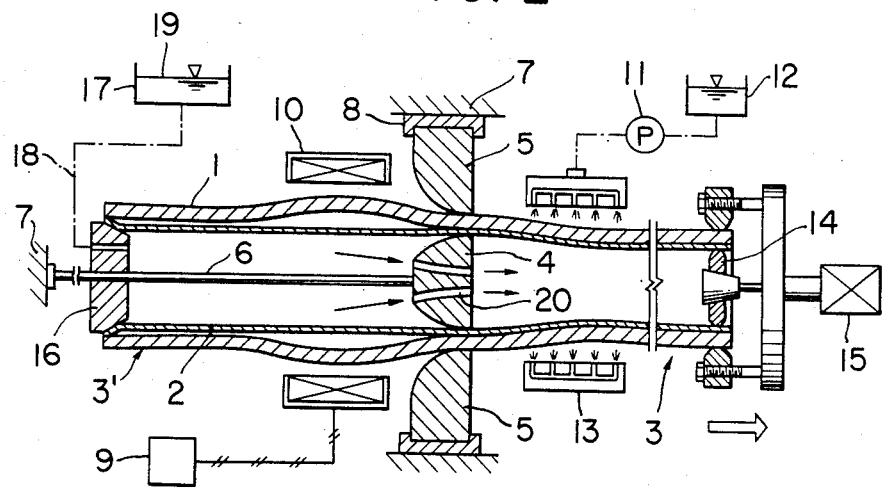
FIG. 2 is a side elevation, with parts shown in vertical section, indicating a mode of practice of the method according to the invention.

FIG. 2 shows a mode of practice of the method of producing a double-wall composite metal pipe according to this invention. In order to produce a double-wall composite pipe, an outer pipe 1 of carbon steel, for example, and an inner pipe 2 of stainless steel, for example, are prepared separately.

The two ends of the inner pipe 2 are temporarily sealed by suitable sealing means, and cooling water is introduced into the interior of the inner pipe 2 to cool it and cause it to contract radially. The inner pipe 2 in this state is inserted into the carbon steel outer pipe 1 of larger diameter at the ambient temperature thereby to obtain a pipe assembly 3', which is left as it is after the cooling water has been drained out of the inner pipe 2.

Into the rear end (right end as viewed in FIG. 2) of the inner pipe 2 of the pipe assembly 3' assembled beforehand in this manner, is forcibly inserted a mandrel 4 of a specific diameter greater than the inner diameter of the inner pipe 2. At the same time, a plastic working means in the form of a die 5 is forcibly fitted over the outside surface of the outer pipe 1. The mandrel 4 and the die 5 are fixed to a base structure 7 respectively by a rod 6 and a die holder 8.

Then, around the pipe assembly 3' and in front (to the left as viewed in FIG. 2) of the die 5, a high-frequency induction heating device 10 controlled by a control device 9 is installed fixedly. At the same time, around the same pipe assembly 3' and to the rear of the die 5, a cooling shower device 13, which can be supplied with cooling water from a cooling water tank 12 via a pump 11, is installed fixedly.

Furthermore, a seal clamp device 14 is secured to the rear end of the pipe assembly 3' and is connected to a pulling device 15 such as a pinion-and-rack mechanism with a drive motor. The above mentioned mandrel rod 6 is passed in sealed state through a front seal cap 16 fitted into and sealing the front end of the pipe assembly. A water supply source 17 for supplying water 19 is connected by way of a flexible conduit 18 to a water passage formed through the front seal cap 16 and thereby communicating with interior of the inner pipe 2.

Through holes 20 are formed through the mandrel 4 from front to rear, whereby the entire interior of the inner pipe 2 can be filled with cooling water.

Then, when the pulling device 15 is operated to draw the pipe assembly 3' rearward at a specific speed, and simultaneously the heating device 10 and the shower device 13 are operated, the following process takes place. Since the mandrel 4 and the die 5 are fixed in position, the inner pipe 2 at that position is mechanically expanded by the mandrel 4 and, as it is thus expanded along its stress-strain curve, exceeds its yield point and undergoes plastic deformation. On the other hand, the portion of the outer pipe 1 heated and increased in diameter by the heating device 10 in front of the die 5 is mechanically constricted by the die 5 and is contracted in integral state against the inner pipe 2 and is then immediately reduced in diameter by the cooling water of the shower device 13 after the constricted portion has passed through the die 5. At the same time, the inner pipe 2 is relieved of the expanding force to which it had been subjected and, in an interference fitted state with the outer pipe 1, is drawn rearward.

By this drawing action on the pipe assembly 3', a tightly fitted double-wall pipe 3 is finally obtained. When the processing reaches the front end of the pipe, the seal cap 16 is disconnected, and the water 19 is drained out of the pipe, which is then extracted from the mandrel 4 and the die 5 and disconnected from the seal clamp device 14. By leaving the processed double-wall pipe 3 standing to cool, the outer pipe 1, which had once been heated by the heating device 10, is cooled to the ambient temperature, and its contraction progresses. On the other hand, the inner pipe 2 is no longer cooled by the cooling water 19, and its temperature rises to the ambient temperature, its diameter increasing accordingly. As a consequence, the fit between the outer and inner pipes 1 and 2 becomes even tighter, whereby a double-wall pipe 3 in a strongly integrated state is ultimately obtained.

Figure 3:
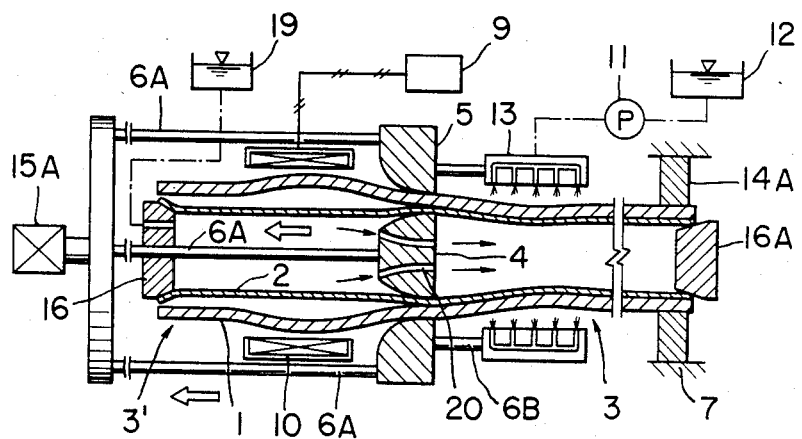
FIG. 3 is a view similar to FIG. 2 indicating another mode of practice of the method.

According to the above described embodiment of the invention, the double-wall pipe 3 is produced by a mode of fabrication wherein the starting pipe assembly is drawn past a mandrel, a die, a heating device, and a cooling device which are fixed in space. In another embodiment of this invention as shown in FIG. 3, conversely, the pipe assembly 3' is held fixed in space, while the above named tools and devices are moved along the pipe assembly.

More specifically, the heating device 10, the mandrel 4, the die 5, and the cooling device 13 are coupled by rods 6A and 6B to a pulling device 15A for forward pulling. The front and rear ends of the inner pipe 2 are sealed with seal caps 16 and 16A and the interior of the pipe assembly 3' is filled with the water 19. The rear end of the pipe assembly 3' is fixed by means of a clamp device 14A to the base structure 7, and the die 5 and the mandrel 4 are caused to travel relative to the pipe assembly 3', while the heating device 10 and the cooling device 13 also are caused to travel in accompaniment therewith. There is essentially no difference in the functional effectiveness of this mode of practice of the invention and that of the preceding embodiment of the invention.

The modes of practicing the method of this invention are not limited to those of the above described embodiments of the invention but can take a variety of other forms.

For example: the heating of the outer pipe may be carried out over the entire front portion of the outer pipe; the heating device may be a steam heater; and the water for cooling the pipe interior may be water undergoing forced circulation.

Further, when the wall of the double-wall pipe is relatively thick, the mandrel 4 may be dispensed with. Furthermore, the cooling of the inner pipe 2 by the cooling water need not necessarily be carried out. The important thing is to establish a temperature difference between the outer and inner pipes before the pipe assembly 3' undergoes the constricting action of the die 5. In principle, the cooling of the outer pipe 1 need not necessarily be carried out by the shower device 13 but may be made by natural air cooling.

Figure 4:
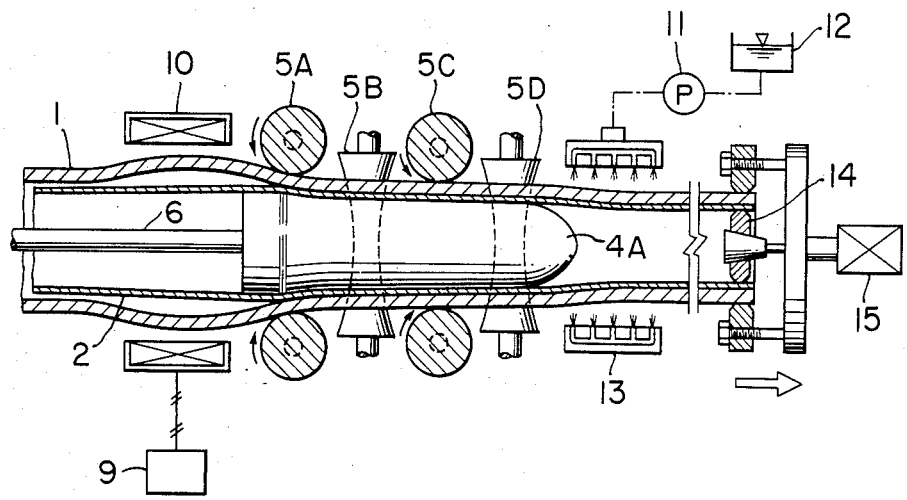
FIG. 4 is a view similar to FIG. 2 indicating a further mode of practice of the method.

In FIG. 4 is illustrated another mode of practice of the method of this invention. In this embodiment, the die 5 shown in FIG. 2 is replaced by a series of rolls 5A, 5B, 5C and 5D, and in connection with the use of these rolls as the plastic working means a relatively long mandrel 4A is used. In other respects, the embodiment of FIG. 4 is identical with that shown in FIG. 2. It will be apparent that the die 5 in the embodiment of FIG. 3 can be replaced by a series of rolls. Also in this embodiment, the mandrel 4 and the cooling of the interior of the inner pipe 2 may be dispensed with.

In the double-wall composite pipe 3 produced by the methods described hereinbefore, the inner and outer pipes 2 and 1 are mechanically interference fitted without any metallurgical bond. However, the two pipes can be metallurgically bonded if a brazing material is interposed therebetween.

Figure 5:
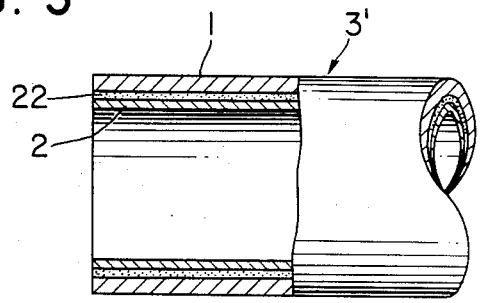
FIG. 5 is a fragmentary view, partly in section, of a pipe assembly in which a brazing material is interposed between an inner pipe and an outer pipe.

FIG. 5 shows a pipe assembly 3' in which a brazing material 22 is interposed between the pipes 1 and 2 beforehand. When this pipe assembly 3 is subjected to the processes described hereinbefore with the temperatures of the outer and inner pipes 1 and 2 being raised higher than the melting point of the brazing material 22 while maintaining a temperature difference between the outer and inner pipes, the composite pipe 3 finally produced will have an interface layer metallurgically bonding the inner and outer pipes.

Figure 6:
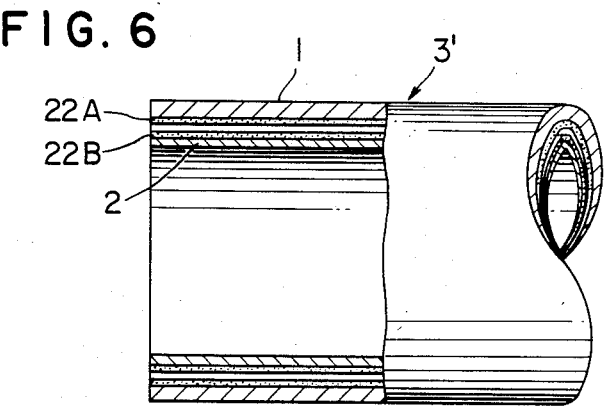
FIG. 6 is a fragmentary section of a pipe assembly in which a brazing material is applied in the form of a surface layer on the inner surface of an outer pipe and on the outer surface of an inner pipe.

The brazing material may be applied as surface layers 22A and 22B to the inner surface of the outer pipe 1 and the outer surface of the inner pipe 2 as shown in FIG. 6. One of the surface layers of the brazing material may be dispersed with.

The application of the surface layer of the brazing material can be made by plating, plasma spraying of powdery brazing material and so on. The brazing material is a nickel base agent in the case of the inner pipe 2 of nickel base superalloy.

What is claimed is:

1. A method of producing a double-wall composite metal pipe, comprising the steps of:
    (a) preparing a pipe assembly made up of an outer pipe and an inner pipe inserted in the outer pipe with an annular clearance therebetween;
    (b) causing the pipe assembly to advance relative to a plastic working means;
    (c) heating the outer pipe in a zone progressively moving along the length thereof as the pipe assembly is caused to advance toward the plastic working means, to raise the temperature of the outer pipe higher than that of the inner pipe, thereby to increase said annular clearance in said moving zone;
    (d) introducing a cooling medium into the inner pipe of the pipe assembly to cool the inner pipe without radial expansion thereof so as to increase the temperature difference between the inner and outer pipes;
    (e) constricting the heated portion of the outer pipe by means of said plastic working means to plastically contract said heated portion against the outer surface of the inner pipe as the pipe assembly is caused to advance through the plastic working means; and
    (f) cooling the contracted portion of the outer pipe after it has passed through the plastic working means, to cause the outer pipe to shrink so as to firmly bind the inner pipe thereby to obtain an interference fit between the inner and outer pipes.

2. A method as claimed in claim 1 wherein the plastic working means is a die.

3. A method as claimed in claim 2 wherein a mandrel is inserted in the inner pipe to hold the pipe assembly from within the same against the constricting action of the plastic working means.

4. A method as claimed in claim 1 wherein the plastic working means is a series of rolls.

5. A method as claimed in claim 4 wherein a mandrel is inserted in the inner pipe to hold the pipe assembly from within the same against the constricting action of the plastic working means.

6. A method as claimed in claim 1 wherein the heating of the outer pipe is carried out by means of a high-frequency induction heating device disposed outside the pipe assembly so as to be movable relative to the pipe assembly.

7. A method as claimed in claim 1 wherein the cooling of the outer pipe is carried out by a cooling shower device disposed outside the pipe assembly so as to be movable relative to the pipe assembly.

8. A method as claimed in claim 1 wherein a mandrel is inserted in the inner pipe to hold the pipe assembly from within the same against the constricting action of the plastic working means and to plastically expand the inner pipe as the pipe assembly is advanced relative to the mandrel.

9. A method of producing a double-wall composite metal pipe, comprising the steps of:
    (a) preparing a pipe assembly made up of an outer pipe and an inner pipe inserted in the outer pipe, and interposing a brazing material between the inner and outer pipes of the pipe assembly, and maintaining an annular clearance between the inner and outer pipes;
    (b) causing the pipe assembly to advance relative to a plastic working means;
    (c) heating the outer pipe in a zone progressively moving along the length thereof as the pipe assembly is caused to advance toward the plastic working means, to raise the temperature of the outer pipe higher than that of the inner pipe thereby to increase said annular clearance in said moving zone, carrying out the heating so as to raise the temperatures of the outer and inner pipes above the melting point of the brazing material, still maintaining a temperature difference between the outer and inner pipes;
    (d) constricting the heated portion of the outer pipe by means of said plastic working means to plastically contract said heated portion against the outer surface of the inner pipe as the pipe assembly is caused to advance through the plastic working means and producting a metallurgical joint between the opposing surfaces of the pipes of the composite metal pipe; and
    (e) cooling the contracted portion of the outer pipe after it has passed through the plastic working means, to cause the outer pipe to shrink so as to firmly bind the inner pipe thereby to obtain a tighter fit between the inner and outer pipes.

10. A method as claimed in claim 9 wherein the brazing material is applied as a surface layer on at least one of the opposing surfaces of the pipes.

11. A method as claimed in claim 10 wherein the surface layer is applied by plating.

12. A method as claimed in claim 10 wherein the surface layer is applied by plasma spraying of powdery brazing material.

* * * * *